(12) United States Patent
Nassef

(10) Patent No.: US 7,181,883 B1
(45) Date of Patent: Feb. 27, 2007

(54) BAIT CHUMMER

(76) Inventor: Namon A. Nassef, 11562 Clear Creek Dr., Pensacola, FL (US) 32514

( * ) Notice: Subject to any disclaimer, the term of this patent is extended or adjusted under 35 U.S.C. 154(b) by 242 days.

(21) Appl. No.: 10/603,336

(22) Filed: Jun. 26, 2003

(51) Int. Cl.
*A01K 97/02* (2006.01)

(52) U.S. Cl. .................................... 43/44.99

(58) Field of Classification Search ............ 43/44.99; 222/630
See application file for complete search history.

(56) References Cited

U.S. PATENT DOCUMENTS

| | | | | |
|---|---|---|---|---|
| 3,249,257 A | * | 5/1966 | Nolt | 222/80 |
| 4,685,242 A | * | 8/1987 | Stanish | 43/44.99 |
| 4,959,921 A | * | 10/1990 | Stanish et al. | 43/44.99 |
| 5,205,778 A | * | 4/1993 | Korkuch | 452/155 |
| 5,720,124 A | * | 2/1998 | Wentzell et al. | 43/44.99 |
| 6,012,368 A | * | 1/2000 | Gicesku | 83/147 |
| 6,363,652 B1 | | 4/2002 | Spinelli | |
| 6,530,171 B2 | * | 3/2003 | Stevens et al. | 43/44.99 |
| 6,581,322 B1 | * | 6/2003 | Spinelli | 43/44.99 |
| 2003/0015143 A1 | * | 1/2003 | Bresolin | 119/51.04 |

* cited by examiner

*Primary Examiner*—Kurt Rowan

(57) ABSTRACT

A chummer chops up bait and expels the chopped up bait into the water wherein the chummer has a housing with an opening for receiving the bait. A motor has a shaft extending through the housing and has at least one cutting blade for chopping the bait gravitationally falling through the housing. An impeller blade is attached to the shaft, the impeller blade drawing water into the housing, wherein the water is mixed with the chopped up bait and the mixture subsequently expelled from the housing.

18 Claims, 1 Drawing Sheet

BAIT CHUMMER

BACKGROUND OF THE INVENTION

1. Field of the Invention

The present invention relates to an automatic bait chummer that macerates and ejects the bait from the device without the need for manual operation.

2. Background of the Prior Art

Chumming is a standard form of baiting fish and other aquatic life for subsequent capture. Basically, chumming involves cutting up bait and other food products (scrap meat, synthetic bait, etc.,) and placing the cut up bait into the water wherein the bait will be detected by bait fish or by the fish to be captured, which fish approach the bait and come within range of the fisherman. Chumming can be as simple as manually cutting the bait up and throwing it overboard, although chumming devices have been proposed that assist in the chumming process. Some simple devices include burlap or netted bags that are filled with the cut up bait and hung over the side of the vessel or the dock if chumming land side. The bag prevents the bait from sinking or floating away and allows placement of the bait. However, these bags, like throwing the bait over the side, require the fisherman to manually cut up the bait, which is labor intensive, time consuming, and messy, especially if a very fine cut consistency is desired. In order to address such problems, some automation was introduced into the chummers, wherein bait is placed into an opening in the chummer, and the chummer is plunged up and down through the water by the user, such up and down reciprocal movement through the water causing the reciprocation or rotation of one or more blades within the chummer, which blades chop the bait up prior to expulsion from the device. While such devices relieve the user from having to manually chop the bait, they still require a considerable amount of manual effort in plunging the device up and down within the water. Other devices have been proposed that attempt to eliminate the manual effort of using a chummer by providing some form of a motor to perform the chopping of the bait. Bait is fed into such a device and the operation of the motor causes the blade to chop the bait. While such prior art devices relieve the user from having to either manually chop the bait or to manually operate the chummer, such devices are unduly complex in design and construction making them expensive to manufacture, operate, and maintain. Additionally, such devices are very difficult to clean after the fishing expedition is over.

Therefore, there exists a need in the art for a chummer that addresses the above-stated problems experienced in the art, which chummer relieves the user from either having to manually chop the bait or having to manually operate the chummer. Such a device should automatically chop and expel bait with minimal interaction from the user. Such a device must be relatively simple in design and construction so that it is relatively inexpensive to manufacture, and is relatively easy to operate and maintain. Ideally, such a device is easy to clean after use of the device is complete.

SUMMARY OF THE INVENTION

The bait chummer of the present invention addresses the aforementioned needs in the art. The bait chummer relieves the user from either having to manually chop the bait or having to manually operate the chummer. The bait chummer automatically chops and expels bait with minimal interaction from the user. The present invention is relatively simple in design and construction making the bait chummer relatively inexpensive to manufacture, and relatively easy to operate and maintain. The bait chummer is easy to clean after use of the invention is complete.

The bait chummer of the present invention is comprised of a housing that has a top cap, a bottom cap, an inlet port, an outlet port, and an opening for receiving bait. A motor is attached to the top cap of the housing, the motor has a shaft that axially extends through the housing. A first cutting blade is attached to the shaft, while an impeller blade is also attached to the shaft. The housing is placed into the water so that the inlet port and the outlet port are beneath the water line, bait is placed into the opening, and the motor is activated and rotates the shaft. The bait falls through the housing and is cut up by the first cutting blade while the impeller blade draws water through the inlet port into the housing wherein the water is mixed with the cut up bait and the mixed water and cut up bait are expelled through the outlet port. The motor may be an electric motor and the motor is reversible. A second blade may be attached to the shaft between the first cutting blade and the impeller blade. The distance between the first cutting blade and the second cutting blade is changeable by an appropriate spacer that is disposed between the first cutting blade and the second cutting blade. A mounting bracket attached to the housing for mounting the housing to an appropriate surface, the mounting bracket being pivotally attached to the housing. The end of the shaft that is opposite the motor is received within a bearing assembly attached to the bottom cap. The bottom cap is removably attached to the housing.

DESCRIPTION OF THE PREFERRED EMBODIMENT

Figure 1:
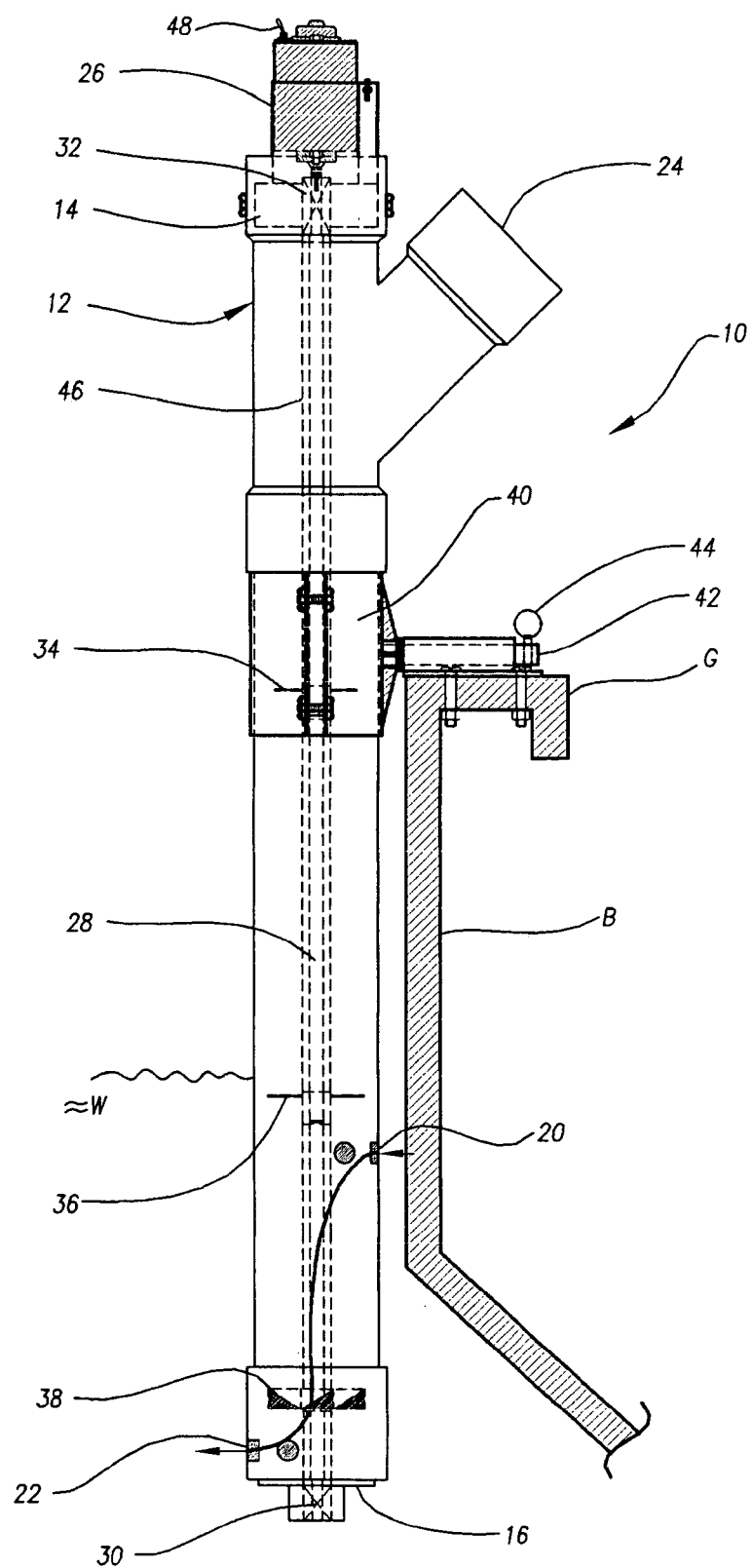
FIG. 1 is a side elevation view of the chummer of the present invention.

Referring now to the drawings, it is seen that the bait chummer of the present invention, generally denoted by reference numeral 10, is comprised of a housing 12 that has a top cap 14 and a bottom cap 16. The housing 12 and its top cap 14 and bottom cap 16, may be made from any appropriate sturdy material such as aluminum, PVC, etc. The top cap 14, the bottom cap 16, or both may be removable from the housing 12 in order to gain service access into the housing 12, and may be frictionally attached to the housing 12, or may be attached by any appropriate attachment mechanism, screws, bolts, etc. An inlet port 20 is located on the housing 12 toward the bottom of housing 12, while an outlet port 22 is also located on the housing 12 (while the outlet port 22 is illustrated on the bottom cap 16, the outlet port 22 is still considered to be a part of the housing 12), advantageously below the inlet port 20. An opening 24 is located on the housing 12, toward the housing's top end, the opening 24 receiving bait.

A motor 26 is attached to the housing 12 at an appropriate location such as on the top cap 14. The motor 26, which may be electric, gas, etc., has a shaft 28 that axially extends through the housing 12 and is received within an appropriate bearing assembly 30 attached to the bottom cap 16. An additional bearing assembly 32 encompasses the shaft 28 and is located on the top cap 14, the two bearing assemblies 30 and 32, helping steady the shaft 28 during shaft 28 rotation. The motor 26 is reversible so that shaft 28 rotation is reversible. A first cutting blade 34 is attached to the shaft 28, while a second cutting blade 36 may be attached to the shaft 28. Additional cutting blades may also be attached to the shaft 28. An impeller blade 38 is also attached to the shaft 28 below the lowest positioned cutting blade and between the inlet port 20 and the outlet port 22.

A mounting bracket 40 is attached to the housing 12 for mounting the housing 12 to an appropriate surface such as the illustrated gunwale G of a boat B. The mounting bracket 40, which may be of any appropriate design known in the art, such as the illustrated rod 42 and pin 44 assembly, is being pivotally attached to the housing 12. Other designs of mounting brackets are anticipated and are in keeping within the scope and spirit of the present invention 10. Additionally, the mounting bracket may be of appropriate design such that the bait chummer 10 of the present invention received within a rod holder on board the boat B or the dock to which the bait chummer 10 is to be attached.

In order to use the chummer 10 of the present invention, the first cutting blade 34 is mounted on the shaft 28 and, if desired, one or more second cutting blades 36 are also mounted on the shaft 28. The selection of the number of cutting blades and the design of each cutting blade is dependent on the type of bait used and the level of maceration desired. For example, the first cutting blade 34 may produce a coarse chop of the bait, while the second cutting blade provides a fine chop of the bait. Or, the first cutting blade 34, may produce a fine chop of the bait and the second cutting blade 36 produces an ultra fine chop of the bait. The spacing between each blade, as well as between the motor and the first blade 34, and the first blade 34 or the second blade (if used) and the impeller blade 38, is accomplished by appropriate spacers 46 that are interspaced between each respective pair of items to be spaced. Once all the blades 34, 36, and 38, and the appropriate spacers 46 are properly positioned about the shaft 28, the cap 14 or 16 that was removed from the housing 12 in order to outfit the shaft 28 is secured back to the housing 12. The housing 12 is mounted to an appropriate surface, the illustrated gunwale G, a dock, etc., by the mounting bracket 40. The housing 12 is mounted so it is partially submerged under the water W line and that both the inlet port 20 and the outlet port 22 are below the water W line. If the inlet port 20 and the outlet port fail to fall below the water W line, an appropriate extension (not illustrated) is attached to the housing 12 so as to assure that the inlet port 20 and the outlet port 22 are properly positioned below the water W line. If the motor 26 is electric, the motor 26 is electrically coupled to a source of electrical power, battery, the boat's or dock's electrical system, etc., (none illustrated), and the motor 26 is activated causing rotation of the shaft 28 and the attached blades 34, 36, and 38. Desired bait is placed into the opening 24 wherein the bait begins falling through the housing 12. As the bait falls onto each first blade 34 and second blade 36, these blades chop the bait up. Simultaneously, the impeller blade 38 draws water W into the housing 12 through the inlet port 20 and expels the water W through the outlet port 22. As the chopped up bait reaches the water W that is drawn into the housing 12 by the impeller blade 38, the bait mixes with the water W such that the mixture of chopped bait and water W is expelled through the outlet port 22, thereby automatically performing a chumming operation. If the device 10 becomes clogged, the motor 26 is reversed so as to back flush the device 10. When chumming is complete, water W is poured through the opening 24 in order to flush the device 10. Additionally, the motor 26 can again be reversed in order to back flush the device 10. Appropriate switches 48 are provided for this reversal of the motor 26 as well as for overall motor 26 operation. If the boat operator forgets that the chummer 10 is attached to the side of the boat B and begins to move the boat B, the pivotal mount of the mounting bracket 40 to the housing 12 allows the housing 12 to pivot and ride along the top of the water W during boat B travel.

While the invention has been particularly shown and described with reference to an embodiment thereof, it will be appreciated by those skilled in the art that various changes in form and detail may be made without departing from the spirit and scope of the invention.

I claim:

1. A chummer comprising:
   a housing having an inlet port, an outlet port, and an opening for receiving bait;
   a motor attached to the housing, the motor having a shaft axially extending through the housing;
   a first cutting blade attached to the shaft;
   an impeller blade attached to the shaft and located between the inlet port and the outlet port and below the first cutting blade, wherein rotation of the shaft causes rotation of the impeller blade which causes water to be drawn into the housing through the inlet port and discharged through the outlet port whenever the outlet port is positioned below the water line; and
   wherein the housing is placed into the water so that the inlet port and the outlet port are beneath the water line, the bait is placed into the opening, and the motor is activated and rotates the shaft such that bait falls through the housing and is cut up by the first cutting blade and the impeller blade draws water through the inlet port into the housing wherein the water is mixed with the cut up bait and the mixed water and cut up bait are expelled through the outlet port.

2. The chummer as in claim 1 wherein the motor is an electric motor.

3. The chummer as in claim 1 wherein the motor is reversible such that the rotation of the shaft is reversible.

4. The chummer as in claim 1 further comprising a second blade attached to the shaft between the first cutting blade and the impeller blade.

5. The chummer as in claim 4 wherein the distance between the first cutting blade, and the second cutting blade is changeable.

6. The chummer as in claim 4 further comprising a spacer disposed between the first cutting blade and the second cutting blade.

7. The chummer as in claim 1 further comprising a mounting bracket attached to the housing.

8. The chummer as in claim 7 wherein the mounting bracket is pivotally attached to the housing.

9. A chummer comprising:
   a housing having a top cap, a bottom cap, an inlet port, an outlet port, and an opening for receiving bait;
   a motor attached to the top cap of the housing, the motor having a shaft axially extending through the housing;
   a first cutting blade attached to the shaft;
   an impeller blade attached to the shaft and located between the inlet port and the outlet port and below the first cutting blade, wherein rotation of the shaft causes rotation of the impeller blade which causes water to be drawn into the housing through the inlet port and discharged through the outlet port whenever the outlet port is positioned below the water line; and
   wherein the housing is placed into the water so that the inlet port and the outlet port are beneath the water line, the bait is placed into the opening, and the motor is activated and rotates the shaft such that bait falls through the housing and is cut up by the first cutting blade and the impeller blade draws water through the inlet port into the housing wherein the water is mixed with the cut up bait and the mixed water and cut up bait are expelled through the outlet port.

10. The chummer as in claim 9 wherein the motor is an electric motor.

11. The chummer as in claim 9 wherein the motor is reversible such that the rotation of the shaft is reversible.

12. The chummer as in claim 9 further comprising a second blade attached to the shaft between the first cutting blade and the impeller blade.

13. The chummer as in claim 12 wherein the distance between the first cutting blade and the second cutting blade is changeable.

14. The chummer as in claim 12 further comprising a spacer disposed between the first cutting blade and the second cutting blade.

15. The chummer as in claim 9 further comprising a mounting bracket attached to the housing.

16. The chummer as in claim 15 wherein the mounting bracket is pivotally attached to the housing.

17. The chummer as in claim 9 wherein an end of the shaft is received within a bearing assembly attached to the bottom cap.

18. The chummer as in claim 9 wherein the bottom cap is removably attached to the housing.

* * * * *